United States Patent [19]

Ichimura et al.

[11] Patent Number: 5,258,139

[45] Date of Patent: Nov. 2, 1993

[54] EPOXY RESIN AND ADHESIVE COMPOSITION CONTAINING THE SAME

[75] Inventors: Nobuo Ichimura; Mitsuo Yamazaki, both of Takahagi; Kohei Fujita, Hitachi; Hidetaka Satou, Hitachi; Yasuo Miyamoto, Hitachi; Masao Kawasumi, Hitachi; Tohru Kikuchi, Hitachi, all of Japan

[73] Assignee: Hitachi Chemical Company, Ltd., Tokyo, Japan

[21] Appl. No.: 687,639

[22] Filed: Apr. 19, 1991

[30] Foreign Application Priority Data

Apr. 20, 1990 [JP] Japan .................. 2-106293
Jun. 14, 1990 [JP] Japan .................. 2-156456
Jul. 27, 1990 [JP] Japan .................. 2-200186
Apr. 3, 1991 [JP] Japan .................. 3-071183

[51] Int. Cl.$^5$ ............................ H01B 1/02
[52] U.S. Cl. ....................... 252/514; 252/500; 523/435; 523/458; 525/487; 528/27; 528/29; 549/214; 549/215
[58] Field of Search ............ 549/215, 214; 523/435, 523/458; 525/487; 528/27, 29; 252/511, 514, 500

[56] References Cited

U.S. PATENT DOCUMENTS

| | | | |
|---|---|---|---|
| 4,652,398 | 3/1987 | Goswami et al. | 252/514 |
| 4,692,272 | 9/1987 | Goswami et al. | 252/514 |
| 4,794,153 | 12/1988 | Rich | 528/26 |
| 4,826,916 | 5/1989 | Policastro et al. | 524/755 |
| 4,874,548 | 10/1989 | Hajovsky | 252/511 |
| 5,015,700 | 5/1991 | Herzig et al. | 525/487 |

FOREIGN PATENT DOCUMENTS 320211 6/1989 European Pat. Off. .
3-079624 4/1991 Japan .
810284 3/1959 United Kingdom .

*Primary Examiner*—Ralph H. Dean, Jr.
*Attorney, Agent, or Firm*—Antonelli, Terry, Stout & Kraus

[57] ABSTRACT

An adhesive composition comprising (a) an epoxy resin obtained by reacting a 1,3-bis(dicarboxyphenyl)-1,1,3,3-tetrasubstituted disiloxane dianhydride with an alcohol or alcohol derivative, followed by reaction with an epoxy compound having two or more epoxy groups, or an epoxy resin obtained by reacting a 1,3-bis(dicarboxyphenyl)-1,1,3,3-tetrasubstituted disiloxane with an epoxy compound having two or more epoxy groups and (b) a curing agent is suitable for bonding semiconductor chips to a copper frame with a small warpage of the chips.

13 Claims, 10 Drawing Sheets

EPOXY RESIN AND ADHESIVE COMPOSITION CONTAINING THE SAME

BACKGROUND OF THE INVENTION

This invention relates to an epoxy resin, an adhesive composition containing such an epoxy resin, a process for producing such an epoxy resin having good flexibility and use of the adhesive composition for producing a semiconductor device.

As aromatic epoxy resins, there have been known bisphenol A type, bisphenol F type and bisphenol AD type epoxy resins obtained from bisphenol and epichlorohydrin, phenol novolak type epoxy resins and cresol novolak type epoxy resins obtained from novolak resins, and naphthalene skeleton-containing or alicyclic epoxy resins. These aromatic epoxy resins are used together with amine curing agents, acid anhydride curing agents, phenol resin curing agents, or the like, as casting resins, molding materials for electric and electronic parts, etc. With the development of recent technology, it is desired to have a lower modulus of elasticity.

On the other hand, as epoxy resins containing siloxane linkages, there have been known 1,3-bis(3-glycidoxypropyl)-1,1,3,3-tetramethyldisiloxane, 3-glycidoxypropyldimethylpolysiloxane, etc. But, it is impossible to lower the modulus of elasticity when 1,3-bis(3-glycidoxypropyl)-1,1,3,3-tetramethyldisiloxane is used. Further, when 3-glycidoxypropyldimethylpolysiloxane is used, the modulus of elasticity can be lowered, but heat resistance is also lowered.

Thus, an epoxy resin which can lower the modulus of elasticity without lowering heat resistance is desired.

On the other hand, in the assembly of resin encapsulated semiconductor devices, solder or electroconductive adhesives have been used in order to lower the production cost in a step of bonding IC's, LSI's, etc. to lead frames. As the electroconductive adhesives, there are generally used compositions comprising an epoxy resin mixed with a silver (Ag) powder, a novolak type phenol resin as a curing agent for the epoxy resin (bisphenol A type or novolak type) and a curing accelerator such as an imidazole as disclosed in Japanese Patent Examined Publication No. 63-4701.

Recently, with higher density of integration of LSI's, chips are enlarged. On the other hand, lead frames of iron alloys such as 42 alloy lead frames are to be substituted with copper frames. When chips are bonded to such copper frames using the above-mentioned epoxy resin adhesive, warpage of chips becomes larger with the enlargement of chips, resulting in changing properties. The warpage of chips is caused by stress generated from a difference in thermal expansion coefficients of chips and copper (chips $3.5 \times 10^{-6}$ $1/°C$, copper frame $17 \times 10^{-6} 1/°C$, 42 alloy lead frame $4.4 \times 10^{-6} 1/°C$).

The warpage of chips also depends on a modulus of elasticity of adhesive. The smaller the modulus of elasticity becomes, the smaller the warpage of chips becomes due to absorption of the stress mentioned above.

Therefore, adhesives having a low modulus of elasticity which can absorb the stress between chips which are to be enlarged more and more hereinafter and copper frames, and rapid curing properties are demanded.

SUMMARY OF THE INVENTION

It is an object of the present invention to provide an adhesive composition containing an epoxy resin and relaxing the warpage of chips. It is another object of the present invention to provide epoxy resins and processes for producing such epoxy resins used in the adhesive composition. It is a further object of the present invention to provide a process for using the adhesive composition for producing a semiconductor device.

The present invention provides an adhesive composition comprising an epoxy resin obtained by reacting a 1,3-bis(dicarboxyphenyl)-1,1,3,3-tetrasubstituted disiloxane dianhydride with an alcohol or alcohol derivative, followed by reaction with an epoxy compound having two or more epoxy groups, or an epoxy resin obtained by reacting a 1,3-bis(dicarboxyphenyl)-1,1,3,3-tetrasubstituted disiloxane with an epoxy compound having two or more epoxy groups.

The present invention also provide a process for using the adhesive composition mentioned above for producing a semiconductor device.

The present invention further provides an epoxy resin represented by the formula:

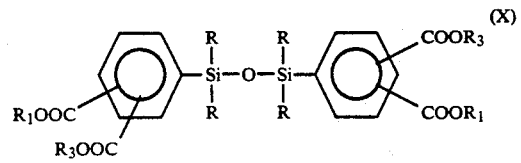

wherein R is an alkyl group or a phenyl group; $R_1$ is a residue of an alcohol; $R_3$ is a residue of an epoxy compound; and the ester groups are independently bonded to 2- and 3-positions or 3- and 4-positions, or an epoxy resin represented by the formula;

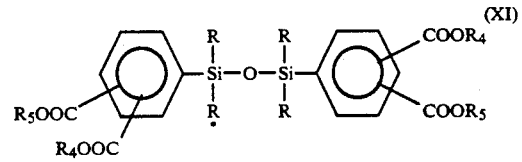

wherein R is as defined above; $R_4$ and $R_5$ are independently a residue of an epoxy compound; and the ester groups are independently bonded to 2- and 3-positions or 3- and 4-positions.

The present invention further provides a process for producing an epoxy resin, which comprises reacting a 1,3-is(dicarboxyphenyl)-1,1,3,3-tetrasubstituted disiloxane dianhydride with an alcohol or alcohol derivative, followed by reaction with an epoxy compound having two or more epoxy groups.

The present invention still further provides a process for producing an epoxy resin, which comprises reacting a 1,3-bis(dicarboxyphenyl)-1,1,3,3-tetrasubstituted disiloxane with an epoxy compound having two or more epoxy groups.

DESCRIPTION OF THE PREFERRED EMBODIMENTS

Figure 1:
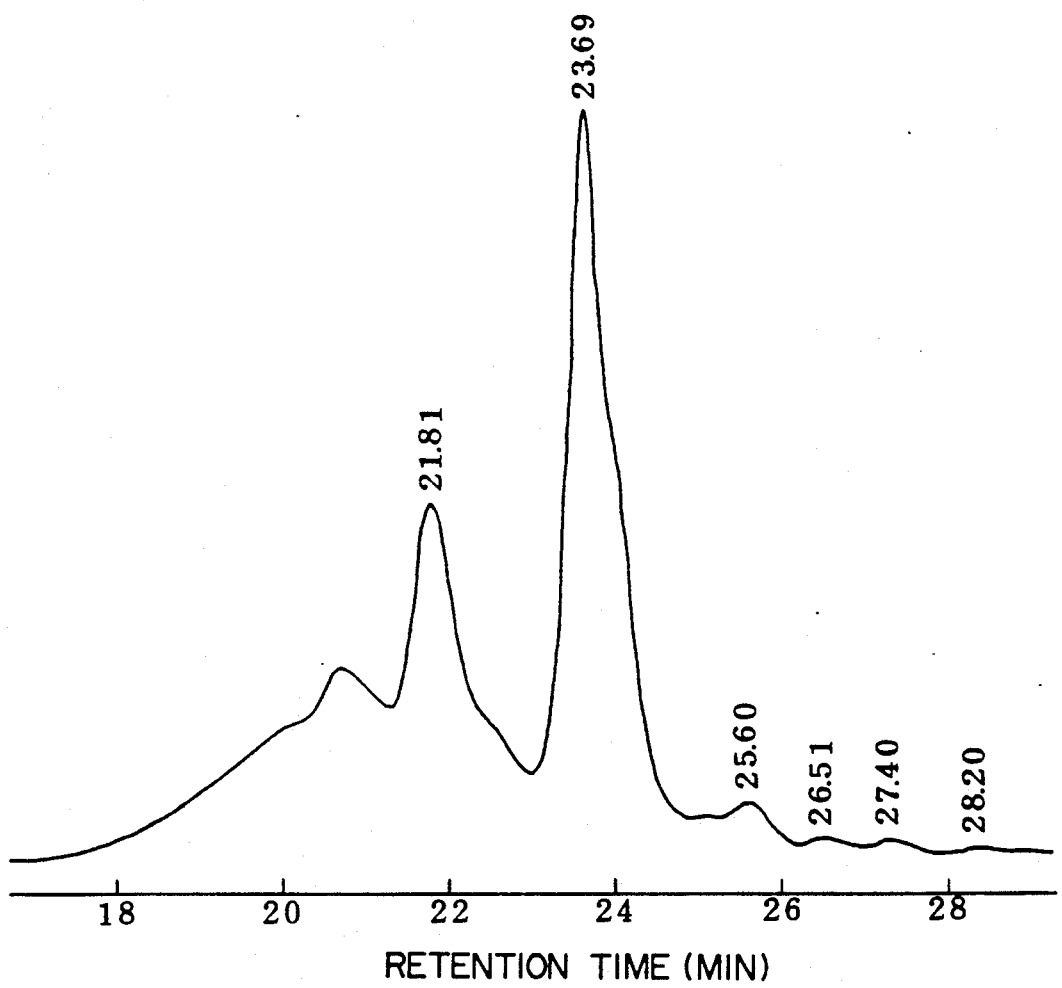
FIG. 1 is a chart of gel permeation chromatography of the reaction product obtained in Example 1.

The 1,3-bis(dicarboxyphenyl)-1,1,3,3-tetrasubstituted disiloxane dianhydride is represented by the formula:

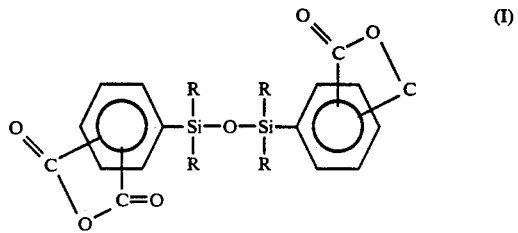
(I)

wherein R is an alkyl group preferably having 1 to 3 carbon atom or a phenyl group; and carboxylic acid anhydride groups are independently bonded to 2, 3-positions or 3, 4-positions.

The 1,3-bis(dicarboxyphenyl)-1,1,3,3-tetrasubstituted disiloxane is represented by the formula:

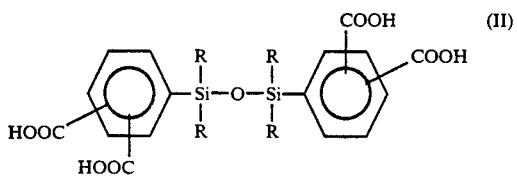
(II)

wherein R is as defined above; and carboxyl groups are independently bonded to 2, 3-positions or 3, 4-positions.

The alcohol or alcohol derivative is represented by the formula:

HO—R$_1$   (III)

wherein R$_1$ is a saturated or unsaturated organic group such as an alkyl group, a residue of alcohol and having one or more double bonds, ester linkages or ether linkages; said organic group may contain one or more ether linkages or one or more ester linkages.

The epoxy resins produced by the processes of the present invention have the following skeleton:

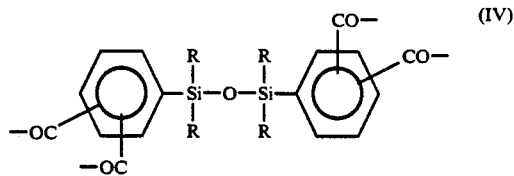
(IV)

As the epoxy compound, there can be used the following compounds represented by the formulae:

(V)

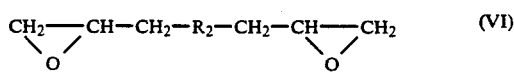
(VI)

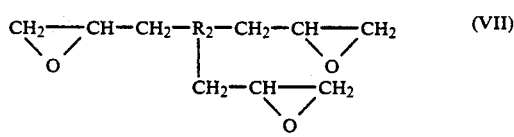
(VII)

wherein R$_2$ is a monovalent, divalent or trivalent organic group such as an alkyl group, an alkyl ether group, an alkyl ester group, an alkylene group, an alkylene ether group, an alkylene ester group, an aromatic group, an aromatic ether group, an aromatic ester group, etc.

As the epoxy compound, those having two or more epoxy groups are used. It is also possible to use two or more epoxy compounds having one epoxy group, or to use an epoxy compound having one epoxy group together with an epoxy compound having two or more epoxy groups.

Using the above-mentioned raw materials, the epoxy resins can be produced. For example, the epoxy resin of the formula (VIII) can be produced by reacting the dianhydride of the formula (I) with the alcohol or alcohol derivative of the formula (III), followed by reaction with the epoxy compound of the formula (VI) as follows:

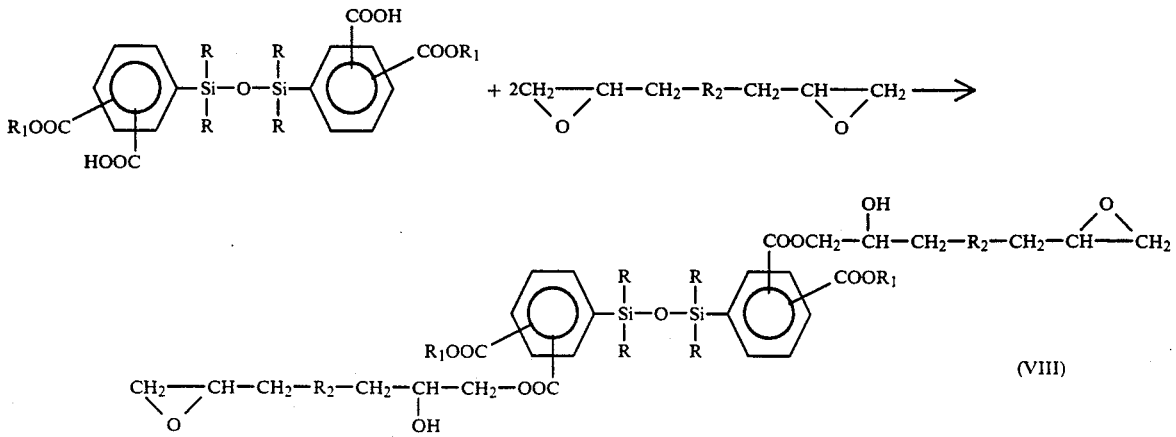
(VIII)

Further, the epoxy resin of the formula (IX) can be produced by reacting the siloxane of the formula (II) with the epoxy compound of the formula (V) and the epoxy compound of the formula (VI).

As the alcohol or alcohol derivative of the formula (III), there can be used monohydric alcohols such as methanol, ethanol, propanol, isopropanol, butanol, allyl alcohol, oleyl alcohol, etc.; polyhydric alcohols such as

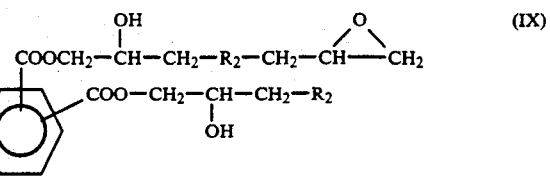
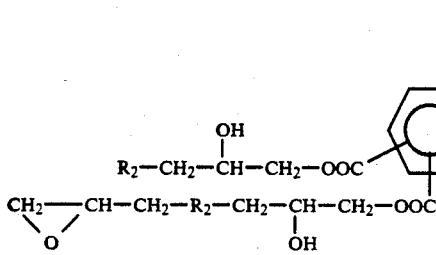

(IX)

The epoxy resin represented by the formula:

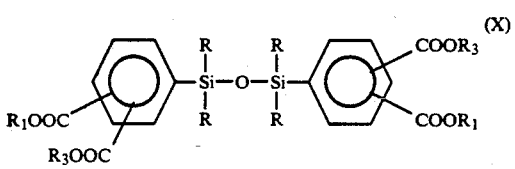

(X)

wherein R is an alkyl group or a phenyl group; $R_1$ is a residue of an alcohol; $R_3$ is a residue of an epoxy compound; and the ester groups are independently bonded to 2- and 3-positions or 3- and 4-positions, is novel.

Further, the epoxy resin represented by the formula:

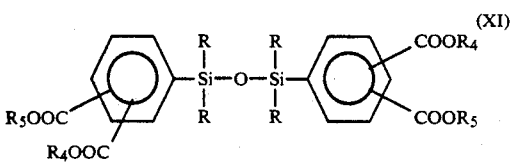

(XI)

wherein R is an alkyl group or a phenyl group; $R_4$ and $R_5$ are independently a residue of an epoxy compound; and the ester groups are independently bonded to 2- and 3-positions or 3- and 4-positions, is also novel.

These epoxy resins can be produced as follows.

A 1,3-bis(dicarboxyphenyl)-1,1,3,3-tetrasubstituted disiloxane dianhydride (I) is reacted with an alcohol or alcohol derivative (III) preferably in equivalent amounts, if necessary in the presence of a solvent, followed by reaction with an epoxy compound having two or more epoxy groups, if necessary in the presence of a catalyst to produce an epoxy resin.

Further, a 1,3-bis(dicarboxyphenyl)-1,1,3,3-tetrasubstituted disiloxane is reacted with an epoxy compound having two or more epoxy groups, if necessary in the presence of a solvent and catalyst to produce an epoxy resin.

As the 1,3-bis(dicarboxyphenyl)-1,1,3,3-tetrasubstituted disiloxane dianhydride of the formula (I), there can be used 1,3-bis(3,4-dicarboxyphenyl)-1,1,3,3-tetramethyldisiloxane dianhydride (SXDA), 1-(2,3-dicarboxyphenyl)-3-(3,4-dicarboxyphenyl)-1,1,3,3-tetramethyldisiloxane dianhydride, etc.

As the 1,3-bis(dicarboxyphenyl)-1,1,3,3-tetrasubstituetd disiloxane of the formula (II), there can be used 1,3-bis(3,4-dicarboxyphenyl-1,1,3,3-tetramethyldisiloxane (SXTA), 1-(2,3-dicarboxyphenyl)-3-(3,4-dicarboxyphenyl)-1,1,3,3-tetramethyldisiloxane, etc.

ethylene glycol, propylene glycol, glycerine, trimethylolpropane, etc.; ethoxy ethanol, butoxy ethanol, etc. These alcohols or alcohol derivatives can be used alone or as a mixture thereof.

As the epoxy compound having two or more epoxy groups, there can be used divalent epoxy resins such as diglycidyl ether bisphenol A, diglycidyl ether bisphenol AD, diglycidyl ether bisphenol F, diglycidyl ether bisphenol S, a naphthalene skeleton-containing epoxy resin, a biphenyl skeleton-containing epoxy resin, diglycidyl ether of dihydroxybenzophenone, a spiro ring skeleton-containing epoxy resin, a cyclic aliphatic diepoxide, dipentene epoxide, 1,3-bis(glycidoxypropyl)-1,1,3,3-tetramethyldisiloxane, etc.; polyvalent epoxy resins such as phenol novolak epoxy resin, cresol novolak epoxy resin, etc. These epoxy compounds can be used alone or as a mixture thereof.

As the epoxy compound having one epoxy group, there can be used butyl glycidyl ether, allyl glycicyl ether, glycidyl esters of long chain fatty acids having 12 to 14 carbon atoms, propylene oxide, phenyl glycidyl ether, cresyl glycidyl ether, vinylcyclohexene oxide, etc.

As the solvent which is used if necessary, there can be used aromatic solvents such as toluene, xylene, etc.; alcohol derivatives such as ethylene glycol monobutyl ether, ethylene glycol monobutyl ether acetate, etc.; ketone series solvents such as N-methyl-2-pyrrolidone, etc. These solvents can be used alone or as a mixture thereof.

As the catalyst which is used if necessary, there can be used amine catalysts such as benzyldimethylamine, etc.; organic phosphine compounds such as triphenyl phosphine, etc.

The epoxy resin can be produced, for example, by addition reacting 1 mole of the dianhydride of the formula (I) with 2 moles of alcohol or alcohol derivative of the formula (III) in ethylene glycol monobutyl ether acetate at 80° to 150° C. (esterification), followed by reaction with about 2 moles of an epoxy compound having two epoxy groups at 60° to 120° C.

Alternatively, the epoxy resin can be produced, for example, by reacting 1 mole of disiloxane of the formula (II) with 1 to 3 moles of a monovalent epoxy resin in ethylene glycol monobutyl ether acetate in the presence of benzyldimethylamine at 80° top 150° C., followed by reaction with 1 to 3 moles of an epoxy compound having two epoxy groups at 60° to 120° C.

Such a series of reactions can be traced by measuring an acid value.

The thus obtained epoxy resins (those of the formulae (X) and (XI)) can be used for preparing an adhesive composition, a coating composition, etc.

The adhesive composition of the present invention comprises the epoxy resin of the formula (X) obtained by reacting a 1,3-bis(dicarboxyphenyl)-1,1,3,3-tetrasubstituted disiloxane dianhydride of the formula (I) with an alcohol or alcohol derivative, followed by reaction with an epoxy compound having two or more epoxy groups, or the epoxy resin of the formula (XI) obtained by reacting a 1,3-bis(dicarboxyphenyl)-1,1,3,3-tetrasubstituted disiloxane of the formula (II) with an epoxy compound having two or more epoxy groups.

As the curing agent, there can be used polyhydric phenols, polybasic acids, aromatic polyamines, imidazoles, etc.

The polyhydric phenols are condensates of a phenol and an aldehyde obtained in the presence of a basic catalyst. Such condensates include novolak type phenol resins mainly having 2 or 3 nuclea obtained by condensing a monohydric phenol such as phenol, cresol, xylenol, or the like, or a polyhydric phenol such as resorcin, catechol, hydroquinone, or the like with formaldehyde in the presence of an acidic catalyst.

As the polybasic acids, there can be used pyromellitic anhydride, trimellitic anhydride, maleic anhydride, phthalic anhydride, endomethylenetetrahydrophthalic anhydride, hexahydrophthalic anhydride, etc.

As the aromatic polyamines, there can be used diaminodiphenylmethane and derivatives thereof, etc.

As the imidazoles, there can be used 2-phenyl-4-ethyl-5-hydroxymethyl imidazole, 2-ethyl-4-methylimidazole, 2-phenylimidazole, 1-benzyl-2-methylimidazole, etc.

These curing agents can be used alone or as a mixture thereof. Among them, the novolak type phenol resins are preferable.

The adhesive composition may further contain one or more curing accelerators, coupling agents, fillers, reactive diluents, solvents, and the like.

As the curing accelerators, there can be used organic phosphine compounds such as triphenyl phosphine, etc.; boron salts such as tetraphenyl borate of 1,8-diazabicyclo(5,4,0)undecene-7, etc.; imidazoles such as 2-phenyl-4-methyl-5-hydroxymethylimidazole, etc.

As the fillers, there can be used inorganic insulating powders such as a silica powder, an alumina powder, etc.; electroconductive powders such as a gold powder, a silver powder, a nickel powder, a graphite powder, carbon black, etc. These fillers can be used alone or as a mixture thereof. The use of a silver powder as an electroconductive powder and a silica powder as an insulating powder is preferable.

As the reactive diluents, there can be used conventionally used ones such as phenyl glycidyl ether, cresyl glycidyl ether, etc.

As the solvents, there can be used alcohol derivatives such as butyl Cellosolve, butyl Cellosolve acetate, etc.; nitrogen-containing solvents such as N-methyl-2-pyrrolidone, etc.; aromatic solvents such as xylene, toluene, etc.; ketones such as methyl ethyl ketone, methyl isobutyl ketone, etc.

The adhesive composition can be prepared by dissolving and mixing the epoxy resin obtained as mentioned above and a novolak phenol resin in a flask at 80° to 100° C., cooling the resulting mixture to 20° to 30° C., and kneading a silver powder as a filler, a curing accelerator, a coupling agent, and the like using a three-roll mill.

The adhesive composition can be used for bonding semiconductor elements to a lead frame made of, for example, copper. For example, a semiconductor device as shown in FIG. 11 can be produced by coating the adhesive composition 4 on a copper frame as shown in FIG. 10 using a dispenser, mounting a semiconductor element 3, curing the adhesive composition in a hot air circulating oven at 150° C. to 200° C. or using a heat block at 200° C. to 350° C., connecting the semiconductor element to the lead frame with wires 5, and encapsulating the resulting member with a resin such as epoxy molding compound 6 conventionally used.

Figure 10:
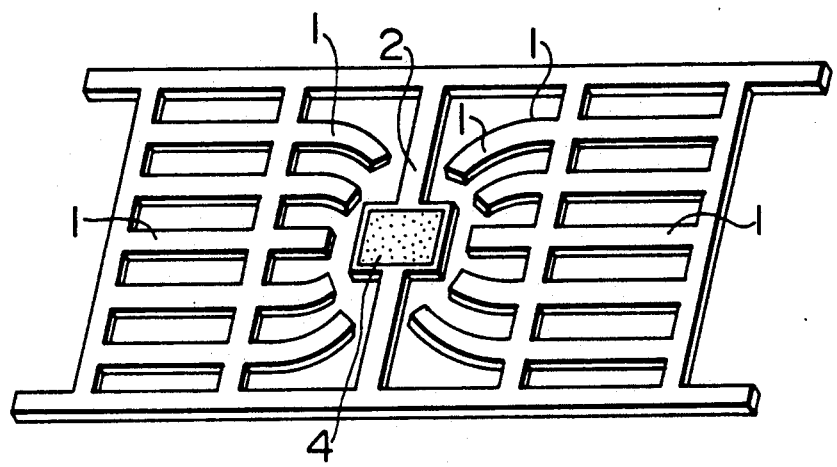
FIG. 10 is a perspective view of a lead frame coated with an adhesive composition.

FIG. 10 is a perspective view of a lead frame on which the adhesive composition is coated. In FIG. 10, numeral 1 denotes a lead frame, numeral 2 denotes an island of lead frame, and numeral 4 is the adhesive composition.

Figure 11:
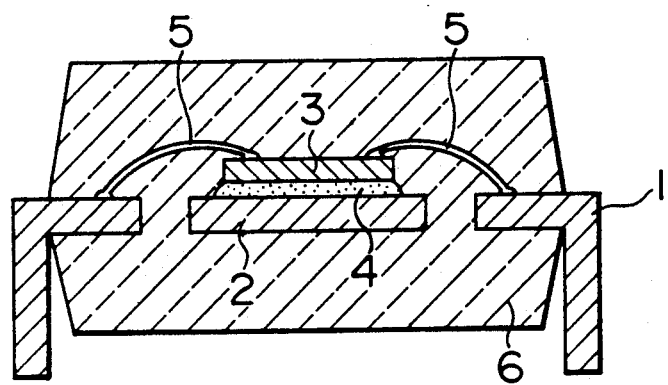
FIG. 11 is a cross-sectional view of a semiconductor device.

FIG. 11 is a cross-sectional view of a semiconductor device, wherein numeral 3 denotes a semiconductor element (IC chip), numeral 5 is a wire, and numeral 6 is an epoxy molding compound.

Thus, there is provided a semiconductor device comprising a substrate (a lead frame), an adhesive composition coated on an island of the lead frame, a semiconductor element placed on the adhesive composition and bonded to the island of the lead frame via the adhesive composition, wires connecting the semiconductor element and the lead frame, and a molded resin encapsulating the whole of the lead frame and the semiconductor element.

Since the epoxy resin used in the present invention has good flexibility, the adhesive composition containing such an epoxy resin seems to lower the modulus of elasticity after cured, resulting in making the warpage of chips bonded to the copper frame remarkably small.

The present invention is illustrated by way of the following Examples, in which all parts and percents are by weight unless otherwise specified.

PRODUCTION EXAMPLE 1

1,3-Bis(3,4-dicarboxyphenyl)-1,1,3,3-tetramethyldisiloxane dianhydride (SXDA, molecular weight 426 or less) in an amount of 27.6 parts was reacted with 35 parts of n-octadecyl alcohol (molecular weight 270) at 140° C. for 1 hour. Then, 52.9 parts of diglycidyl ether bisphenol AD (R-710, a trade name, mfd. by Mitsui Petrochemical Industries, Ltd., molecular weight 326, epoxy equivalent 163) and 0.1 part of benzyldimethylamine were added to the reaction solution and reacted at 80° C. for 3 hours to obtain a reaction product from SXDA and the epoxy compound. The resulting product had an acid value of 17.

FIG. 1 shows a chart of gel permeation chromatography (GPC). FIG. 1 shows that the reaction product has a molecular weight of 1500 (23.69 min).

PRODUCTION EXAMPLE 2

SXDA in an amount of 27.6 parts, 4.2 parts of octyl alcohol (molecular weight 130), and 26.2 parts of n-octadecyl alcohol were reacted at 120° C. for 1 hour. Then, 46.5 parts of R-710 and 1 part of benzyldimethylamine were added to the reaction solution and reacted at 80° C. for 5 hours to obtain a reaction product from SXDA and the epoxy compound. The reaction product had an acid value of 17.

Figure 2:
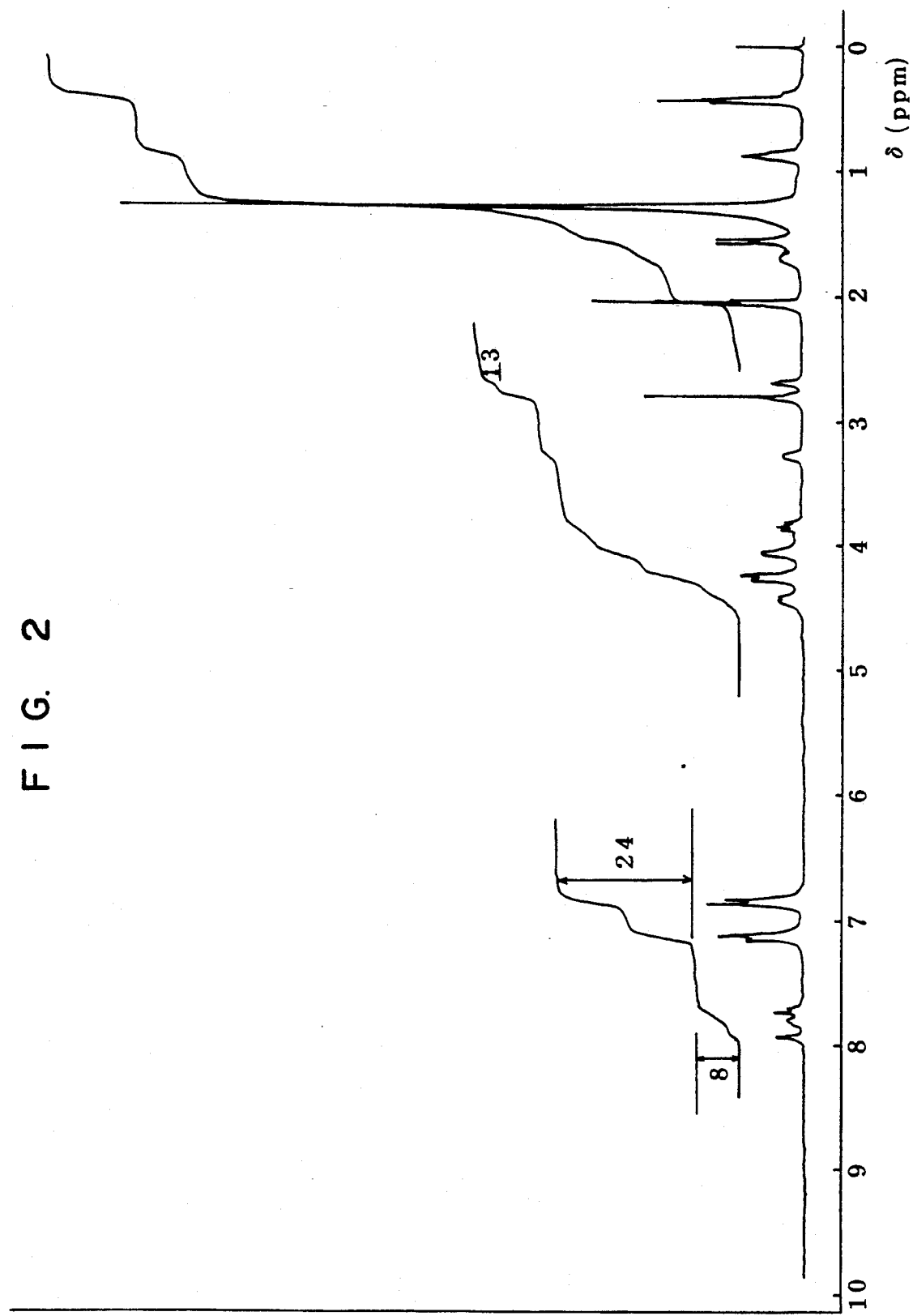
FIG. 2 is a $^1$H-NMR spectrum of the reaction product obtained in Example 2.

FIG. 2 shows $^1$H-NMR spectrum of the thus obtained reaction product. $^1$H-NMR spectra of R-710 and SXDA are shown in FIGS. 3 and 4, respectively.

Figure 3:
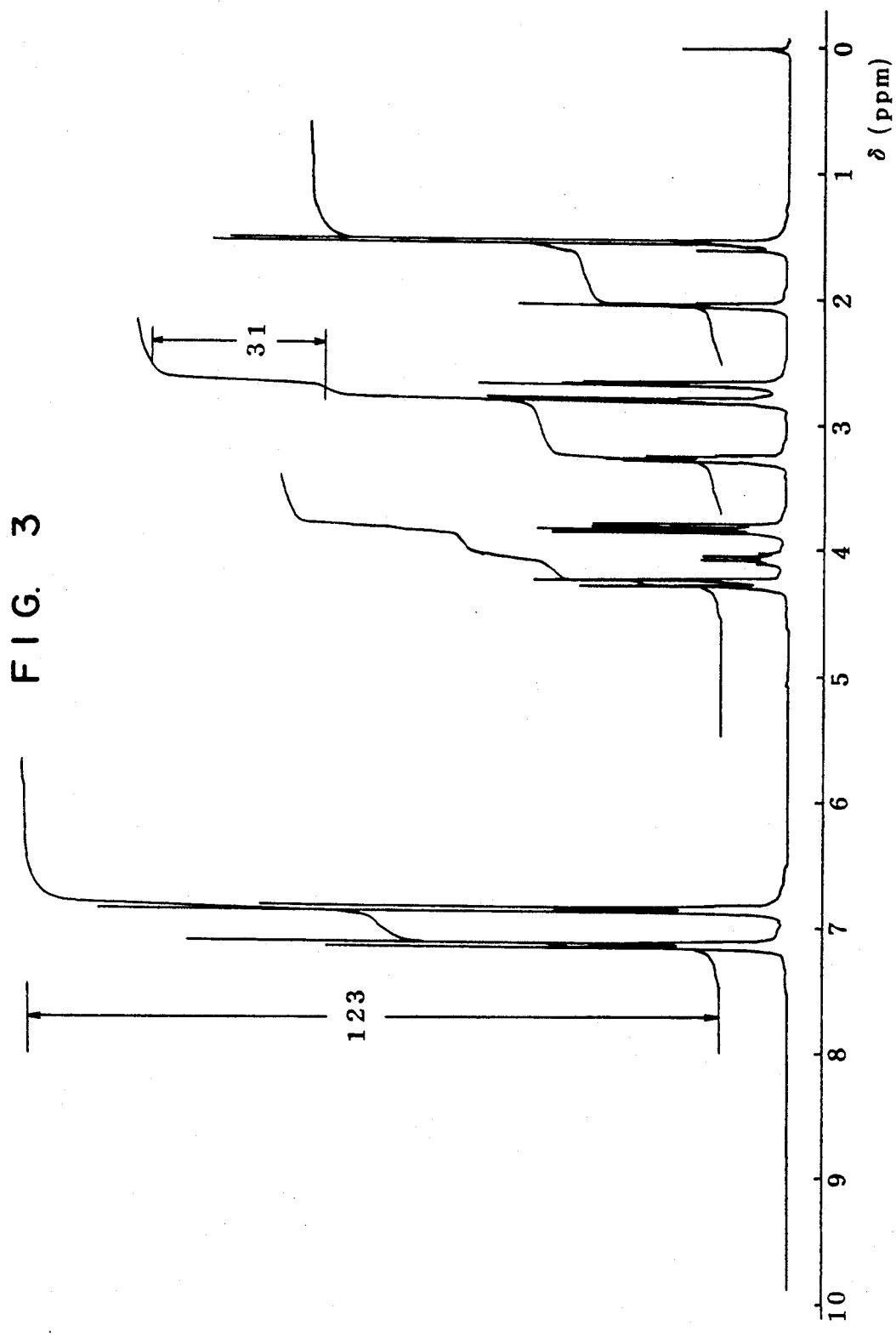
FIG. 3 is a $^1$H-NMR spectrum of R-710.

In FIG. 3, the intensity ratio of the aromatic ring H proton occurring at 6.8 to 7.2 ppm to one H proton in the $CH_2$ in the glycidyl ring occurring at 2.7 ppm is 8/2 (123/31). This shows that two glycidyl groups are adducted to two aromatic rings.

When FIG. 2 is analyzed in the same manner as mentioned above, the above-mentioned proton intensity ratio becomes 8/1 (24/3). This means that a half of the glycidyl groups is reduced by the reaction.

Figure 4:
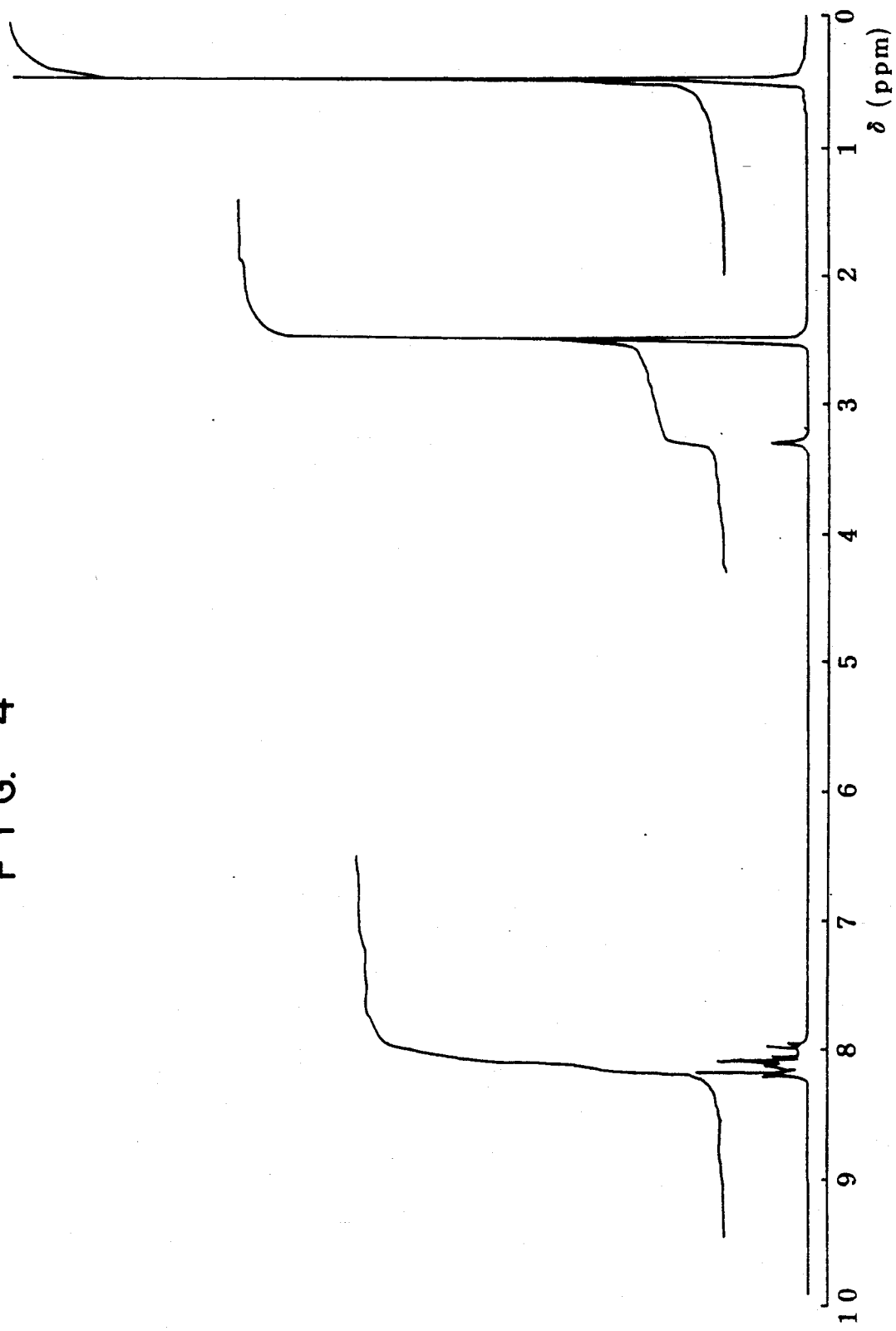
FIG. 4 is a $^1$H-NMR spectrum of SXDA.

On the other hand, FIG. 4 shows $^1$H-NMR spectrum of SXDA, wherein a peak due to the H proton in aromatic ring is shown at about 8 ppm. In FIG. 2, the ratio of the intensity (24) of the H proton in the aromatic ring of epoxy compound at 6.8-7.2 ppm to the intensity (8) of aromatic ring of SXDA at about 8 ppm is 24/8. This means that 2.2 moles of epoxy compound is adducted to 1 mole of SXDA. Further, the peak at 0.4 ppm in FIG. 2 is due to "—$CH_3$" in Si—$(CH_3)_3$.

PRODUCTION EXAMPLE 3

Using the same formulation as used in Production Example 2, SXDA was reacted with the alcohol at 140° C. for 1 hour, followed by reaction with the epoxy compound at 80° C. for 5 hours to give a reaction product having an acid value of 6.9.

Figure 5:
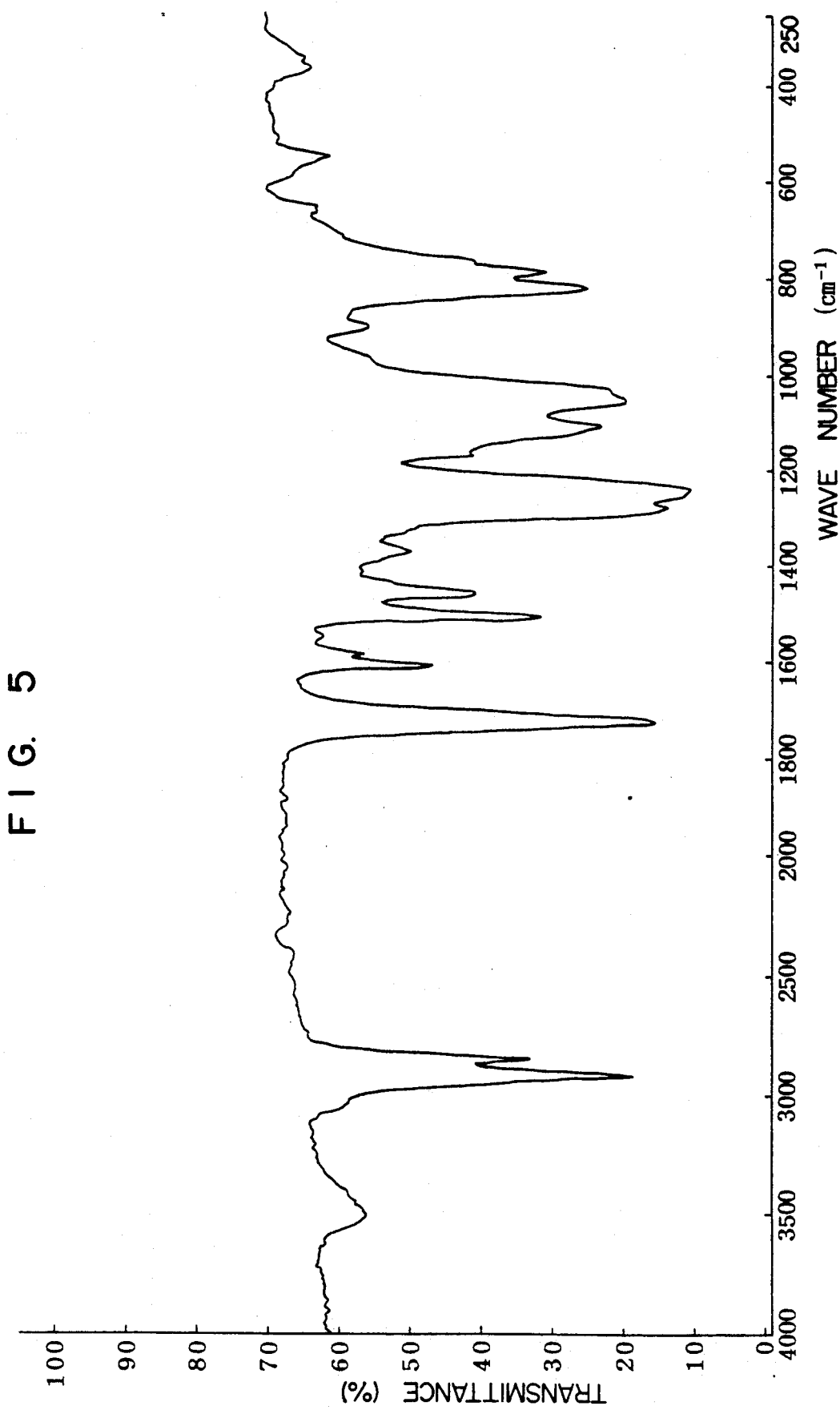
FIG. 5 is an IR spectrum of the reaction product obtained in Example 2.

FIG. 5 shows an IR spectrum of a mixture obtained by adding 6 parts of γ-glycidoxypropyltrimethoxysilane (KBM-403, mfd. by Shin-Etsu Chemical Co., Ltd.) to the resulting reaction product.

Figure 6:
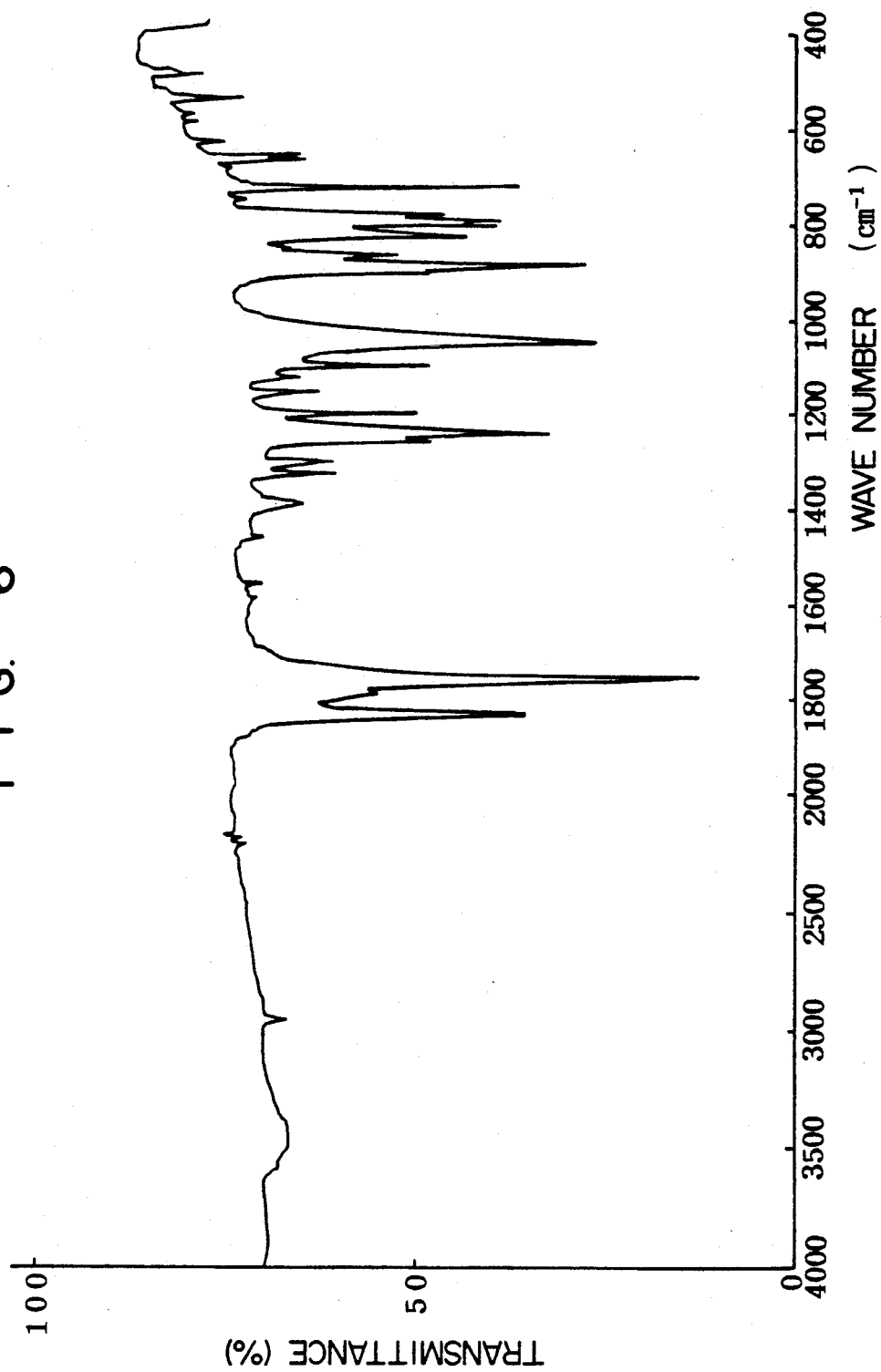
FIG. 6 is an IR spectrum of SXDA.

FIG. 6 shows an IR spectrum of SXDA.

As is clear from FIGS. 5 and 6, the absorptions at 1750 and 1850 cm$^{-1}$ due to aromatic acid anhydride group shown in FIG. 6 are not shown in FIG. 5 wherein the absorption at 1720 cm$^{-1}$ due to the carbonyl of ester and the absorption at 900 cm$^{-1}$ due to epoxy group are shown, instead. This means that the carboxylic acid is esterified and epoxy is retained.

PRODUCTION EXAMPLE 4

1,3-Bis(dicarboxyphenyl)-1,1,3,3-tetramethyldisiloxane (hereinafter referred to as "SXTA", molecular weight 462) in an amount of 17.9 parts and 19.4 parts of Cardura E-10 (a trade name, mfd. by Yuka Shell Epoxy Kabushiki Kaisha, molecular weight 250) were reacted at 125° C. for 6 hours, followed by addition of 34.3 parts of epoxy resin YX-400 (a trade name, mfd. by Dainippon Ink and Chemicals, Inc., epoxy equivalent 177), 0.09 part of benzyldimethylamine, and 20 parts of butyl Cellosolve acetate as a solvent to the reaction solution. The reaction was carried out at 80° C. for 16 hours, to give a reaction product having an acid value of 9.

Figure 7:
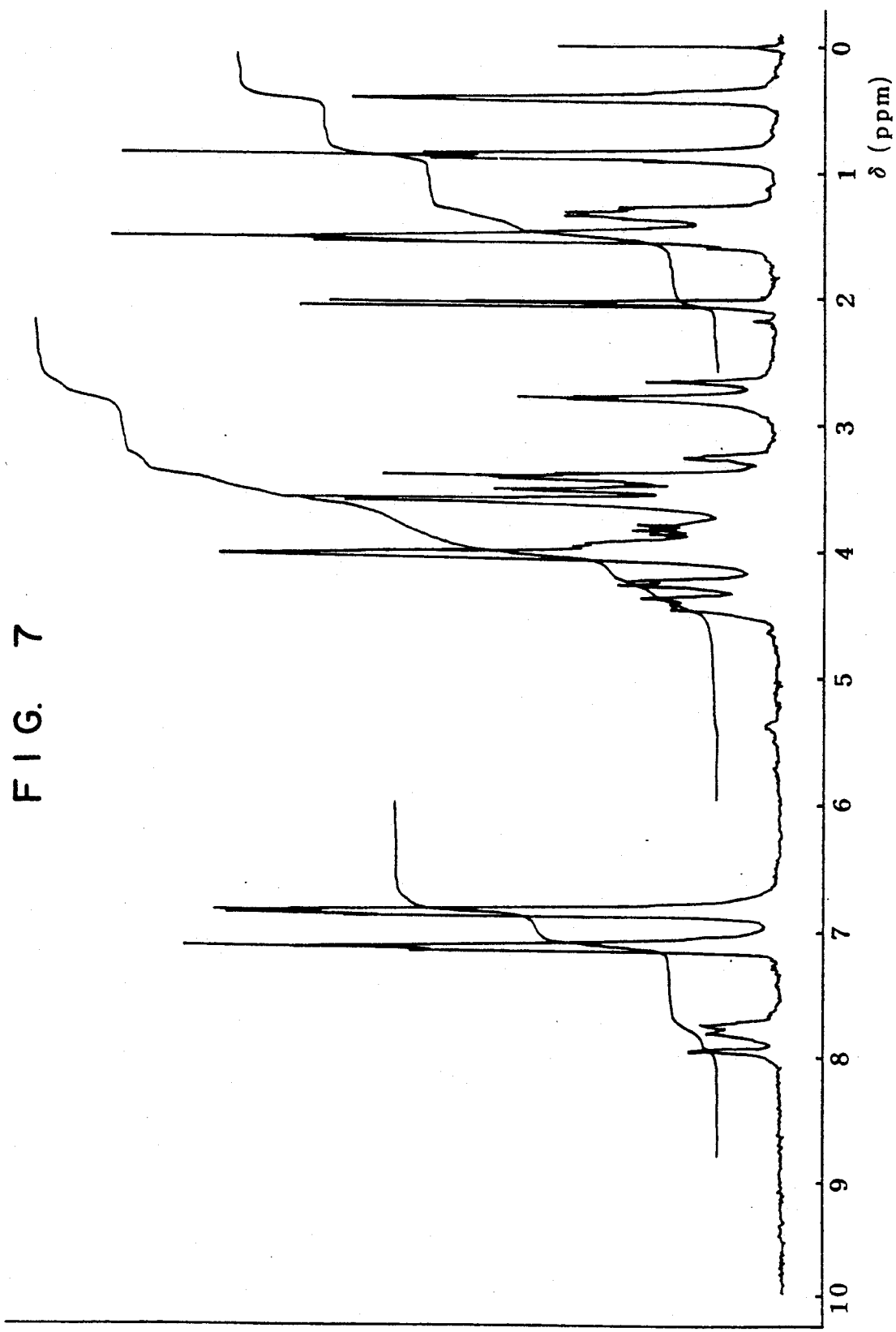
FIG. 7 is a $^1$H-NMR spectrum of the reaction product obtained in Example 4.
Figure 8:
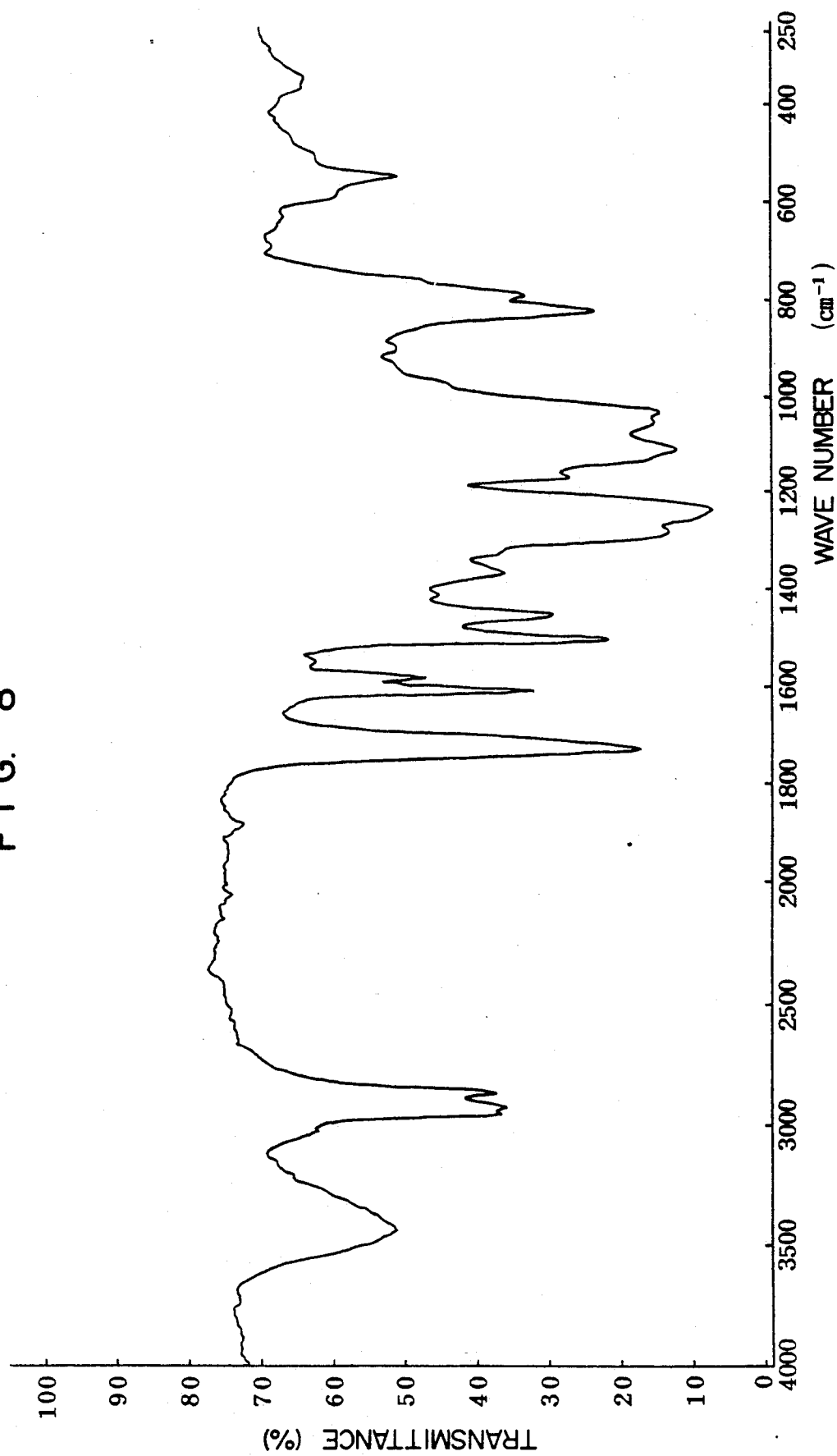
FIG. 8 is an IR spectrum of the reaction product obtained in Example 4.
Figure 9:
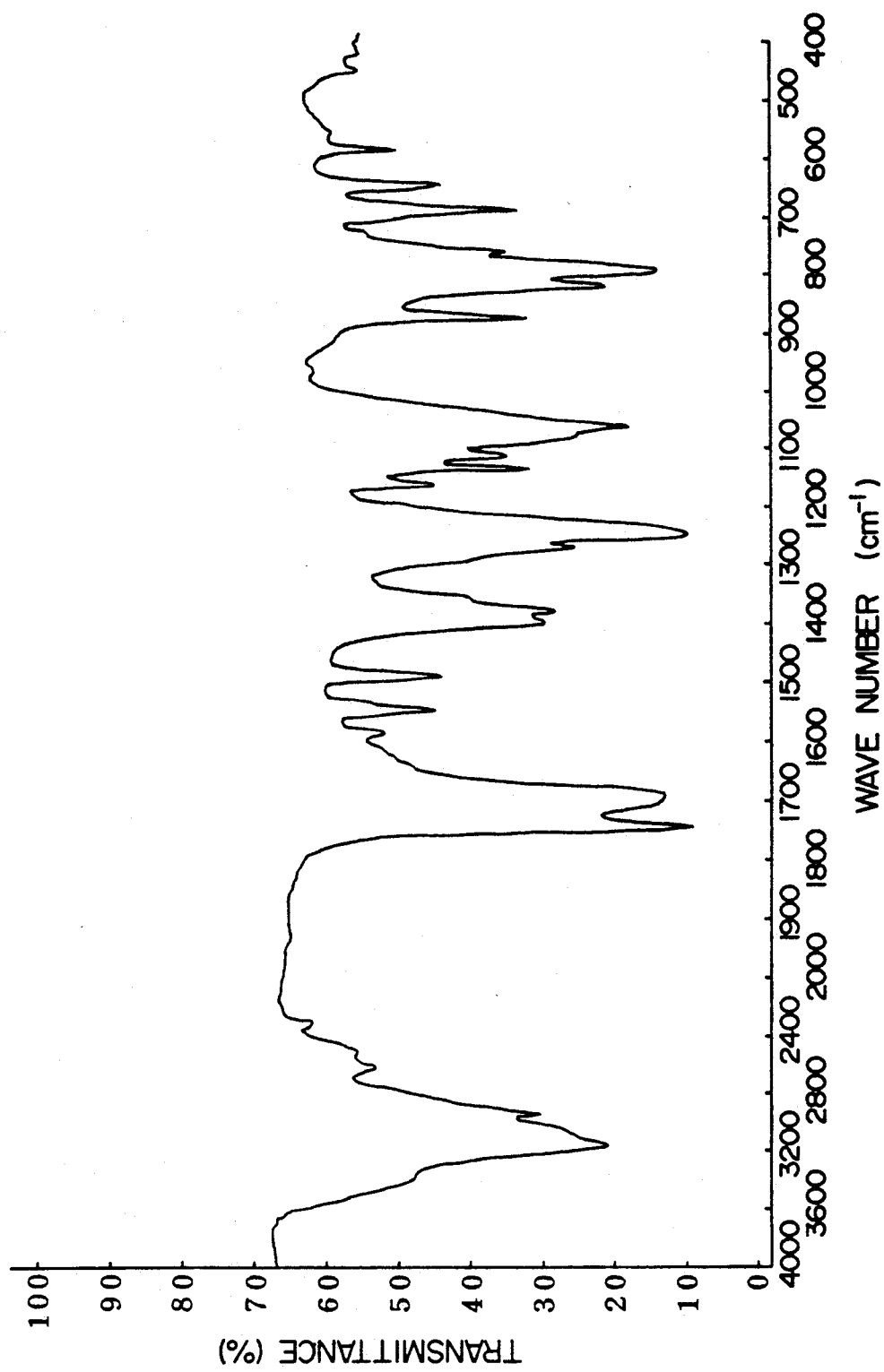
FIG. 9 is an IR spectrum of SXTA.

FIG. 7 shows a $^1$H-NMR spectrum of the reaction product. FIG. 8 shows an IR spectrum of the reaction product. FIG. 9 shows an Ir spectrum of SXTA.

In FIG. 7, the spectrum of H proton of $CH_2$ in the glycidyl ring is shown at 2.7 ppm and the spectrum of $CH_3$ in —Si$(CH_3)_3$ is shown at 0.4 ppm. Further, the absorption due to the carboxylic acid at 1740 cm$^{-1}$ shown in FIG. 9 is not shown in FIG. 8. In FIG. 8, the absorption due to ester linkage is shown at 1720 cm$^{-1}$, the absorption due to Si—O bonding at 1250 cm$^{-1}$ and the absorption due to the epoxy group at 900 cm$^{-1}$.

FIGS. 7 to 9 show that the skeleton of SXTA has the epoxy group and the ester linkage.

These results show that the reaction products obtained in Production Examples 1 to 4 are epoxy resins represented by the formula (X) or (XI).

EXAMPLE 1

1,3-Bis(3,4-dicarboxyphenyl)-1,1,3,3-tetramethyldisiloxane (hereinafter referred to as "SXTA") in an amount of 23.1 parts and 25 parts of a $C_{12}$-$C_{14}$ long chain aliphatic glycidyl ester (Cardura E-10, a trade name, mfd. by Shell Chemical Co.) were reacted in the presence of 0.09 part of benzyldimethylamine as a catalyst at 120° C. for 5 hours. Then, 35 parts of biphenyl skeleton-containing epoxy resin (YX-4000, a trade name, mfd. by Dainippon Ink & Chemicals, Inc.; an epoxy equivalent; 177) and 36 parts of ethylene glycol monobutyle ether acetate as a solvent were added to the reaction solution and reacted at 80° C. for 8 hours to obtain an epoxy resin from SXTA and the epoxy compound.

To 143 parts of the epoxy resin, 13 parts of novolak phenol resin (H-1, a trade name, mfd. by Meiwa Plastic Industries, Ltd., weight average molecular weight, 800) and 20 parts of ethylene glycol monobutyl ether were added and heated with stirring at 80° C. for 30 minutes for solving. After cooling to 20° to 30° C., 6 parts of tetraphenyl phosphonium tetraphenyl borate and 339 parts of a silver powder flake-like form, TCG-1, a trade name, mfd. by Tokuriki Chemical Research Co., Ltd. average particle size 2.8 μm) were added to the resulting mixture and kneaded using a three-roll mill to give a uniform adhesive composition.

EXAMPLE 2

1,3-Bis(3,4-dicarboxyphenyl)-1,1,3,3-tetramethyldisiloxane dianhydride (hereinafter referred to as "SXDA") in an amount of 21.3 parts and 12 parts of ethylene glycol monobutyl ether were reacted in 29 parts of ethylene glycol monobutyl ether acetate at 120° C. for 2 hours. Then, 35 parts of diglycidyl ether bisphenol F (YDF-170, a trade name, mfd. by Tohto Kasei Co., Ltd., epoxy equivalent 175) and 0.03 part of benzyldimethylamine were added to the reaction mixture and reacted at 80° C. for 3 hours to give an epoxy resin which is a reaction product of SXDA and the epoxy compound.

To 143 parts of the epoxy resin, 16 parts of novolak resin (H-1, a trade name, mfd. by Meiwa Plastic Industries, Ltd., weight average molecular weight 800) and 20 parts of ethylene glycol monobutyl ether were added and heated with stirring at 80° C. for 30 minutes for solving. After cooling to 20° C. to 30° C., 3 parts of tetraphenyl borate of 1,8-diazabicyclo(5,4,0)undecene-7 and 348 parts of a silver powder (flake-like form, TCG-1, a trade name, mfd. by Tokuriki Chemical Research Co., Ltd., average particle size 2.8 μm) were added to the resulting mixture and kneaded using a three-roll mill to give a uniform adhesive composition.

EXAMPLE 3

The process of Example 2 was repeated except for using 3 parts of a silica powder (Aerosil #380, a trade name, mfd. by Nippon Aerosil Co., Ltd.) in place of 348 parts of the silver powder to give an adhesive composition.

COMPARATIVE EXAMPLE 1

An adhesive composition was prepared in the same manner as described in Example 1 except for using 10 parts of glycidyl ether bisphenol A (Epikote 1001, a trade name, mfd. by Shell Chemical Co.), 2.4 parts of novolak phenol resin, 13 parts of ethylene glycol monobutyl ether, 0.6 part of tetraphenyl phosphonium tetraphenyl borate and 39 parts of a silver powder (TCG-1, a trade name) in place of the epoxy resin which is a reaction product of SXTA and epoxy compound obtained in Example 1.

COMPARATIVE EXAMPLE 2

An adhesive composition was prepared in the same manner as described in Example 2 except for using .10 parts of novolak type epoxy resin (DEN-438, a trade name, mfd. by Dow Chemical Co.), 15 parts of ethylene glycol monobutyl ether, 5 parts of novolak phenol resin (H-1, a trade name), 0.3 part of tetraphenyl borate salt of undecene and 45 parts of a silver powder (TCG-1, a trade name) in place of the epoxy resin which is a reaction product of SXDA and epoxy compound obtained in Example 2.

The resulting adhesive compositions were subjected to evaluations of various properties.

The results are shown in Table 1.

TABLE 1

| Example No. | Adhesive strength*1 | | Warpage of chips*2 |
| --- | --- | --- | --- |
| | Cured at 180° C./1 hr (kg/chip) | Cured at 150° C./60 sec (kg/chip) | (cured at 180° C./1 hr) (μm) |
| Example 1 | 5 or more | 3.3 | 24 |
| Example 2 | 5 or more | 3.5 | 20 |
| Example 3 | 5 or more | 3.5 | 10 |
| Comparative Example 1 | 5 or more | 1.5 | 60 or more |
| Comparative Example 2 | 5 or more | 2.8 | 60 or more |

Note)
*1 A silver plated copper frame was coated with an adhesive composition and bonded to a Si chip with 2 mm☐ at a temperature for a period listed in Table 1, followed by measurement of adhesive strength (shear force) at room temperature (23° C.) using a push-pull gauge.
*2 A silver plated copper frame was coated with an adhesive composition and bonded to a silicon chip of 5 mm × 13 mm with heating at 180° C. for 1 hour. The warpage of the chip in the distance of 11 mm among 13 mm was measured using a surface roughness meter.

As mentioned above, since the epoxy resins obtained by the processes of the present invention have good flexibility, the adhesive composition containing such epoxy resins provides a low modulus of elasticity after cured. When the adhesive composition is used in a semiconductor device, the warpage of IC and LSI chips is small and high reliability is obtained against heating cycles.

What is claimed is:

1. An adhesive composition comprising an epoxy resin obtained by reacting a 1,3-bis(dicarboxyphenyl)-1,1,3,3-tetrasubstituted disiloxane dianhydride with an alcohol, followed by reaction with an epoxy compound having two or more epoxy groups, or an epoxy resin obtained by reacting a 1,3-bis(dicarboxyphenyl)-1,1,3,3-tetrasubstituted disiloxane with an epoxy compound having two or more epoxy groups.

2. An adhesive composition according to claim 1, wherein an epoxy compound having one epoxy group and the epoxy compound having two or more epoxy groups are reacted with the 1,3-bis(dicarboxyphenyl)-1,1,3,3-tetrasubstituted disiloxane.

3. An adhesive composition according to claim 1, which further comprises as a curing agent a novolak phenol resin.

4. An adhesive composition according to claim 1, which further comprises a filler.

5. An adhesive composition according to claim 4, wherein the filler is an electroconductive powder.

6. An adhesive composition according to claim 5, wherein the electroconductive powder is a silver powder.

7. An adhesive composition according to claim 4, wherein the filler is an inorganic insulating powder.

8. A process for producing an epoxy resin, which comprises reacting a 1,3-bis(dicarboxyphenyl)-1,1,3,3-tetrasubstituted disiloxane dianhydride with an alcohol, followed by reaction with an epoxy compound having two or more epoxy groups.

9. A process according to claim 8, wherein an epoxy compound having one epoxy group and the epoxy compound having two or more epoxy groups are reacted with the 1,3-bis(dicarboxyphenyl)-1,1,3,3-tetrasubstituted disiloxane dianhydride-alcohol reaction product.

10. A process for producing an epoxy resin, which comprises reacting a 1,3-bis(dicarboxyphenyl)-1,1,3,3-tetrasubstituted disiloxane with an epoxy compound having two or more epoxy groups.

11. A process according to claim 10, wherein an epoxy compound having one epoxy group and the epoxy compound having two or more epoxy groups are reacted with the 1,3-bis(dicarboxyphenyl)-1,1,3,3-tetrasubstituted disiloxane.

12. An epoxy resin represented by the formula:

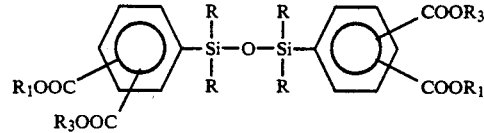

wherein R is an alkyl group or a phenyl group; $R_1$ is an organic residue of an alcohol obtained by removal of a hydroxyl group from the alcohol; $R_3$ is an organic residue of an epoxy compound obtained by removal of an epoxy group from the epoxy compound, said epoxy compound being an epoxy compound having two or more epoxy groups or a mixture of an epoxy compound having two or more epoxy groups and an epoxy compound having one epoxy group; and ester groups are independently bonded to 2- and 3-positions or 3- and 4-positions.

13. An epoxy resin represented by the formula:

wherein R is an alkyl group or a phenyl group; $R_4$ and $R_5$ are independently an organic residue of an epoxy compound obtained by removal of an epoxy group from the epoxy compound, said epoxy compound being an epoxy compound having two or more epoxy groups or a mixture of an epoxy compound having two or more epoxy groups and an epoxy compound having one epoxy group; and ester groups are independently bonded to 2- and 3-positions or 3- and 4-positions.

* * * * *